June 29, 1948.  F. C. WEDLER  2,444,124

METHOD OF FREEZE-DRYING REGENERATED CELLULOSE

Filed March 4, 1944

INVENTOR.
Frederick C. Wedler
BY Carl A. Castellan
ATTORNEY

Patented June 29, 1948

2,444,124

UNITED STATES PATENT OFFICE 2,444,124

METHOD OF FREEZE-DRYING REGENERATED CELLULOSE

Frederick C. Wedler, Media, Pa., assignor to American Viscose Corporation, Wilmington, Del., a corporation of Delaware Application March 4, 1944, Serial No. 525,127

2 Claims. (Cl. 34—5)

This invention relates to methods of drying moisture-laden cellulosic products and to the novel products resulting.

Cellulosic products as, for example, artificial shaped articles, such as filaments, yarns, threads, and the like, which are formed by coagulation of suitable material and then subjected to washing processes, as well as other gel masses containing water of gelation, are usually dried by the application of heat or by circulating warm air currents thereabout. When dried according to those methods, the products tend to lose their original extended structural form and, furthermore, although such drying is accompanied by shrinkage, the dried products still possess a relatively high residual shrinkage capacity, and undergo change when re-wet.

It is an object of the present invention to provide a method of drying moisture-laden cellulosic products which results in dehydrated products having substantially the same physical structure as the undehydrated articles. It is a further object of this invention to provide dehydrated cellulosic products which are characterized by an open, porous structure and which do not readily change dimensionally or lose their porous structure when brought into contact with water. Other objects and advantages will appear hereinafter.

According to the invention, moisture-laden cellulosic products are dehydrated in such a manner that the moisture is transformed to the completely frozen state, and subsequently sublimed off, from the frozen to the gaseous phase without passing through the liquid phase.

After removal of the frozen moisture, in the manner described, there remains a dehydrated cellulosic product which retains substantially the shape and structural characteristics of the undehydrated product, and which has not been deleteriously affected during removal of the water therefrom.

In carrying out the process, the moisture-laden article is first subjected to a temperature below the freezing point of water, as for instance a temperature of about −70° C. If the temperature is brought to the desired low degree very rapidly, the moisture in the article is quickly frozen to the solid state, whereas if the temperature is reduced more gradually, the moisture is transformed to the solid state more slowly.

The crystalline structure and porosity of the final product are controlled by the speed at which freezing is effected. Thus, when freezing is carried out very quickly, large particles of ice are formed which, when sublimed off, leave the article in a highly porous state, whereas, when freezing is effected more slowly, smaller particles of ice are formed which, when sublimed off, leave a product characterized by a lesser degree of porosity but having larger pores. In all instances, however, the article retains its original dimensions.

According to one embodiment of the invention, the moisture-laden article is placed in a sealed vessel and the vessel is subjected to a temperature below the freezing point of water. Alternatively, the moisture-laden article may be wrapped in a protective covering and directly subjected to the desired low temperature.

The necessary low temperature may be maintained, advantageously, by placing the sealed vessel containing the moisture-laden cellulosic product or the protected article itself in a freezing bath consisting of solidified carbon dioxide (Dry Ice) in a solvent such as acetone or "Cellosolve," or, by spraying the sealed vessel or protected article with a cooling substance such as liquid air, Dry Ice, or other freezing medium. After the water has been completely frozen, the vessel may be removed from contact with the freezing medium, and connected, through a high vacuum pump, to a condenser, or, in the case of an article wrapped in a protective covering the article may be removed from the bath and placed in a vessel and the vessel connected through a high vacuum pump to a condenser. If the vessel and its frozen contents are maintained under a sufficiently high vacuum, such as is obtainable with a high vacuum pump, sublimation of the frozen water from the article is effected at a temperature below that at which the ice melts or becomes liquid, that is, at a temperautre below about 0° C., and water vapor leaves the frozen product, without passing through the liquid phase, and is then collected in the condenser. Instead of removing the vessel containing the cellulosic product from the freezing bath after the water has been frozen, the ice may be sublimed off by connecting the vessel to a condenser through a high vacuum pump, while the vessel is positioned in the freezing bath.

According to another embodiment of my invention, the water contained in cellulosic products may be rapidly frozen and then sublimed off, without liquefaction, by continuously transporting the cellulosic product over a freezing drum surface, and then passing the same through a vacuum zone.

My method of drying is applicable wherever it is desired to dehydrate cellulosic products, while at the same time avoiding changes in the structural characteristics thereof, such as the shape, size, porosity, etc. The removal of the water according to my method does not result in contraction of the volume of the product being dehydrated and, as a result, the dehydrated product occupies the same, or substantially the same, volume as the article occupied when in the water-swollen state.

By "cellulosic product," as used herein is meant artificial shaped articles comprising regenerated cellulose, or cellulose derivatives, such as cellulose esters or ethers, as for example, filaments, yarns, threads, and the like, as well as plates, rods, tubes, or other massive forms of regenerated cellulose gel.

As an illustration, the method of dehydration according to this invention may be applied, with good results, to the drying of wound packages of filamentary material, such as skeins, bobbins, or rayon cakes which are constituted by a filament or thread wound on itself in a plurality of layers, such as are obtained in the manufacture of filamentary material according to the viscose process. In that process, the mass of material from which the filaments are formed is extruded into a suitable bath wherein it is coagulated, and, after passing through the coagulating bath, is collected either on a rotating spool or bobbin, or in a rapidly rotating centrifuge in suitable package form, and subjected to various finishing operations, including washing. The usual method of drying filamentary material in such wound packages, involves circulating air through and around the packages. In order to achieve uniformity of results, each and every portion of the filamentary material in the wound package should be subjected to the same conditions of drying. However, in the air-circulating drying processes referred to, even where the drying is conducted at an extremely slow rate in order to minimize the difference in rates of drying at different annular sections of the wound packages, there is a tendency for some layers of filamentary material to dry more rapidly than others, which results in varying dyeing affinities and residual and variable shrinkage capacities of the filaments.

The method of drying filamentary material in wound packages according to my invention entirely overcomes those disadvantages of the usual air-circulating drying procedures and avoids the tendency of the filamentary material when thus dried to develop different affinity for dye as between the material constituting the inner convolutions of the package, and the material constituting the outer convolutions of the package. According to my process, all of the layers of filamentary material making up the package become dry at the same uniform rate of speed, as a result of the freezing of the water and subsequent sublimation thereof, without liquefaction. Furthermore, the filamentary material retains its original structure and does not change dimensionally during the drying operation.

Yarns in skein form which have been dried according to my herein-described method, have been found to possess permanently improved properties, as evidenced by handle, feel, and resistance to structural change on re-wetting, and to have a superior appearance, characterized by an open, porous structure.

The process is also applicable to the dehydration of masses of viscose gel, or the like, which contain water of gelation which it is desirable to remove. For example, when a slab of solid viscose gel is dried according to the method of my invention, the product obtained has a very porous, sponge-like structure, in a greatly extended condition, which is not altered to any appreciable degree when re-wet, and the structure does not change under normal conditions of use, indicating that, although the product, upon drying, was in a greatly extended condition, it had not developed internal stresses or strains which could be relaxed in use, and particularly when re-moistened or subjected to high humidity conditions. Such dehydrated massive viscose gels may be impregnated with rubber and rubber substitutes and plasticizers, whereby they assume a rubber-like elasticity, which renders them useful for numerous practical purposes.

The accompanying drawing illustrates apparatus which may be utilized in carrying out the process of my invention.

Figure 1:
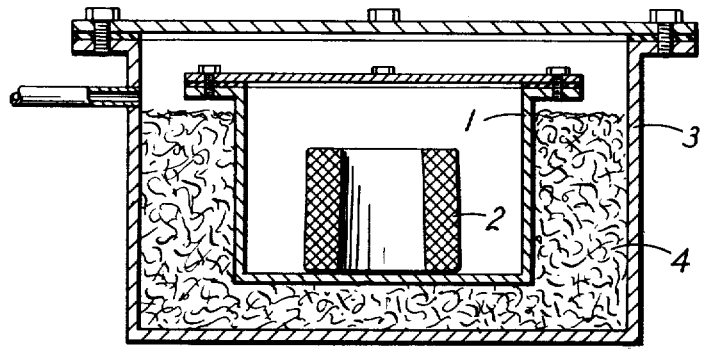
Figure 1 is a front view, partly in cross-section of apparatus suitable for effecting the quick-freezing steps.

Referring more particularly to Figure 1 there is shown a vessel 1 containing a moisture-laden rayon cake 2. Vessel 1 is immersed in freezing bath 4 in container 3. Container 3 is connected with a high vacuum pump (not shown), and high vacuum is applied to bring about reduction of the temperature far below the freezing point of water.

Figure 2:
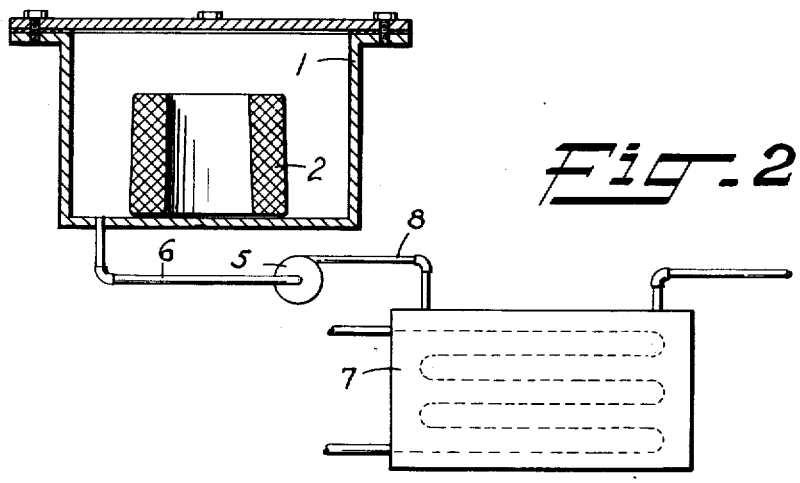
Figure 2 is a front view, partly in cross-section of apparatus which may be used for subliming off the frozen water according to one embodiment of the invention.

When the water held by the rayon cake has been completely frozen, vessel 1 is removed from the freezing bath and connected through connection 6 to vacuum pump 5 which is in turn connected through connection 8 with condenser 7, as shown in Figure 2. The ice leaves the frozen cake and is collected in condenser 7.

The cake or other article is maintained in a solid frozen state and at a low temperature until the ice has been sublimed therefrom, after which the vessel 1 and the cellulosic product contained therein gradually assume the temperature of the surrounding atmosphere. Preferably, application of the high vacuum is continued until the article has attained a comparatively high temperature, which insures the removal of any residual water which may tend to remain in the article after the ice has been sublimed off.

Although as illustrated in Figures 1 and 2, the method is applied to the drying of a single rayon cake, it will be obvious that a plurality of cakes or other cellulosic products may be dried simultaneously, in accordance with the method of my invention. It will also be obvious that, after the cellulosic article has been frozen, the vessel 1 may be connected with condenser 7 through the high vacuum pump, to effect sublimation of the ice, without being removed from container 3.

Figure 3:
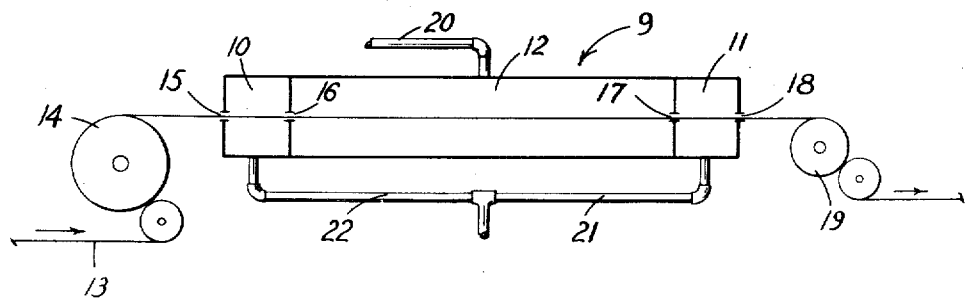
Figure 3 is a plan view of apparatus which may be utilized for subliming off the frozen water in accordance with another embodiment of the invention.

The apparatus shown in Figure 3 may be utilized in the drying of filamentary material such as yarn, thread, or the like containing moisture which has been frozen in accordance with the invention.

Referring to Figure 3, there is shown a drying device 9 which is divided into three zones comprising end chambers 10 and 11 and a central chamber 12. The yarn or the like 13 is passed, after the quick-freezing treatment, over suitable rollers 14, through small orifice 15 into end chamber 10. From there, the yarn passes through small orifice 16 into the central zone or chamber 12, through small orifice 17 into end chamber 11, and through small orifice 18 to the outside, where it is passed over suitable rollers 19 and directed to a suitable wind-up device (not shown). The central zone or chamber 12 is connected with a high vacuum pump through connection 20 for the application of vacuum thereto. A small amount of air may enter the end chambers 10 and 11 through orifices 15 and 18. It is desirable to prevent any such air from escaping from the end chambers into the central chamber 12 and, accordingly the end chambers are preferably maintained under lower pressure than the central chamber. For this purpose, the end chambers are connected with a separate vacuum pump (not shown) through connections 21 and 22.

I am aware that it has been proposed, previously, to subject films of cellulosic material containing water of gelation to freezing, and to then thaw the same and drain the water from the surface thereof. However, that process is different from the process of my invention. In that case, only 55 to 60% of the water is removed by the freezing-thawing operation, the remaining water being removed in the usual manner, whereas, according to my method of dehydration, all of the water retained by the regenerated cellulose product is completely and rapidly removed therefrom without entering the liquid phase.

I claim:

1. The method of manufacturing dimensionally stable cellulosic articles characterized by an extended porous sponge-like structure which is not materially altered by moisture, comprising drying moisture-laden articles comprising freshly precipitated regenerated cellulose by exposing the article to a refrigerant at a temperature of at least 70 degrees C. below zero to quickly freeze substantially all of the water carried by the articles to the solid state, continuously drawing the article, while the water is still in the solid state, through a chamber, and subliming off the frozen water without liquefaction thereof by application of vacuum to the chamber.

2. The method of manufacturing dimensionally stable cellulosic fibers of indefinite length and characterized by an extended porous sponge-like structure which is not materially altered by moisture comprising drying moisture-laden freshly precipitated regenerated cellulose fibers, by exposing the fibers to a refrigerant maintained at a temperature at least 70 degrees C. blow zero to quickly freeze substantially all of the water carried by the fibers to the solid state, continuously drawing the fibers, of indefinite length, while the water is still in the solid state, in unsupported condition through a chamber and subliming off the water without liquefaction thereof by application of vacuum to the chamber.

FREDERICK C. WEDLER.

REFERENCES CITED

The following references are of record in the file of this patent:

UNITED STATES PATENTS

| Number | Name | Date |
|---|---|---|
| Re. 20,969 | Reichel | Jan. 3, 1939 |
| 1,482,386 | Converse | Feb. 5, 1924 |
| 1,861,918 | Hickman | June 7, 1932 |
| 1,970,956 | Elser | Aug. 21, 1934 |
| 2,028,296 | Shoemaker | Jan. 21, 1936 |
| 2,292,447 | Irwin | Aug. 11, 1942 |
| 2,325,652 | Bierwirth | Aug. 3, 1943 |
| 2,345,548 | Flosdorf et al. | Mar. 28, 1944 |
| 2,354,200 | Cutler | July 25, 1944 |

FOREIGN PATENTS

| Number | Country | Date |
|---|---|---|
| 12,642 | Great Britain | 1905 |

---

Certificate of Correction

Patent No. 2,444,124. June 29, 1948.

FREDERICK C. WEDLER

It is hereby certified that error appears in the printed specification of the above numbered patent requiring correction as follows: Column 6, line 14, claim 2, for the word "blow" read *below*; and that the said Letters Patent should be read with this correction therein that the same may conform to the record of the case in the Patent Office.

Signed and sealed this 14th day of September, A. D. 1948.

[SEAL]

THOMAS F. MURPHY,
*Assistant Commissioner of Patents.* chamber 12. The yarn or the like 13 is passed, after the quick-freezing treatment, over suitable rollers 14, through small orifice 15 into end chamber 10. From there, the yarn passes through small orifice 16 into the central zone or chamber 12, through small orifice 17 into end chamber 11, and through small orifice 18 to the outside, where it is passed over suitable rollers 19 and directed to a suitable wind-up device (not shown). The central zone or chamber 12 is connected with a high vacuum pump through connection 20 for the application of vacuum thereto. A small amount of air may enter the end chambers 10 and 11 through orifices 15 and 18. It is desirable to prevent any such air from escaping from the end chambers into the central chamber 12 and, accordingly the end chambers are preferably maintained under lower pressure than the central chamber. For this purpose, the end chambers are connected with a separate vacuum pump (not shown) through connections 21 and 22.

I am aware that it has been proposed, previously, to subject films of cellulosic material containing water of gelation to freezing, and to then thaw the same and drain the water from the surface thereof. However, that process is different from the process of my invention. In that case, only 55 to 60% of the water is removed by the freezing-thawing operation, the remaining water being removed in the usual manner, whereas, according to my method of dehydration, all of the water retained by the regenerated cellulose product is completely and rapidly removed therefrom without entering the liquid phase.

I claim:

1. The method of manufacturing dimensionally stable cellulosic articles characterized by an extended porous sponge-like structure which is not materially altered by moisture, comprising drying moisture-laden articles comprising freshly precipitated regenerated cellulose by exposing the article to a refrigerant at a temperature of at least 70 degrees C. below zero to quickly freeze substantially all of the water carried by the articles to the solid state, continuously drawing the article, while the water is still in the solid state, through a chamber, and subliming off the frozen water without liquefaction thereof by application of vacuum to the chamber.

2. The method of manufacturing dimensionally stable cellulosic fibers of indefinite length and characterized by an extended porous sponge-like structure which is not materially altered by moisture comprising drying moisture-laden freshly precipitated regenerated cellulose fibers, by exposing the fibers to a refrigerant maintained at a temperature at least 70 degrees C. blow zero to quickly freeze substantially all of the water carried by the fibers to the solid state, continuously drawing the fibers, of indefinite length, while the water is still in the solid state, in unsupported condition through a chamber and subliming off the water without liquefaction thereof by application of vacuum to the chamber.

FREDERICK C. WEDLER.

REFERENCES CITED

The following references are of record in the file of this patent:

UNITED STATES PATENTS

| Number | Name | Date |
| --- | --- | --- |
| Re. 20,969 | Reichel | Jan. 3, 1939 |
| 1,482,386 | Converse | Feb. 5, 1924 |
| 1,861,918 | Hickman | June 7, 1932 |
| 1,970,956 | Elser | Aug. 21, 1934 |
| 2,028,296 | Shoemaker | Jan. 21, 1936 |
| 2,292,447 | Irwin | Aug. 11, 1942 |
| 2,325,652 | Bierwirth | Aug. 3, 1943 |
| 2,345,548 | Flosdorf et al. | Mar. 28, 1944 |
| 2,354,200 | Cutler | July 25, 1944 |

FOREIGN PATENTS

| Number | Country | Date |
| --- | --- | --- |
| 12,642 | Great Britain | 1905 |

---

Certificate of Correction

Patent No. 2,444,124.　　　　　　　　　　　　　　　　　　　June 29, 1948.

FREDERICK C. WEDLER

It is hereby certified that error appears in the printed specification of the above numbered patent requiring correction as follows: Column 6, line 14, claim 2, for the word "blow" read *below*; and that the said Letters Patent should be read with this correction therein that the same may conform to the record of the case in the Patent Office.

Signed and sealed this 14th day of September, A. D. 1948.

[SEAL]

THOMAS F. MURPHY,
*Assistant Commissioner of Patents.*